(12) United States Patent
Hassett

(10) Patent No.: US 10,699,343 B2
(45) Date of Patent: Jun. 30, 2020

(54) SECURE FINANCIAL INDEXING

(71) Applicant: John Hassett, Marblehead, MA (US)

(72) Inventor: John Hassett, Marblehead, MA (US)

( * ) Notice: Subject to any disclaimer, the term of this patent is extended or adjusted under 35 U.S.C. 154(b) by 326 days.

(21) Appl. No.: 15/873,272

(22) Filed: Jan. 17, 2018

(65) Prior Publication Data

US 2018/0204286 A1    Jul. 19, 2018

Related U.S. Application Data

(60) Provisional application No. 62/447,587, filed on Jan. 18, 2017.

(51) Int. Cl.
| | |
|---|---|
| *G06Q 40/06* | (2012.01) |
| *G06Q 40/04* | (2012.01) |
| *H04L 9/08* | (2006.01) |
| *H04L 9/32* | (2006.01) |

(52) U.S. Cl.
CPC ............ *G06Q 40/06* (2013.01); *G06Q 40/04* (2013.01); *H04L 9/0825* (2013.01); *H04L 9/3239* (2013.01); *H04L 9/3247* (2013.01)

(58) Field of Classification Search
CPC ...... G06Q 40/04; G06Q 40/06; H04L 9/0825; H04L 9/3239
See application file for complete search history.

(56) References Cited

U.S. PATENT DOCUMENTS

| | | | |
|---|---|---|---|
| 9,128,018 B2* | 9/2015 | Sugano | .................... G01N 3/32 |
| 2005/0060147 A1* | 3/2005 | Norimatsu | ............ G10L 19/032 |
| | | | 704/230 |
| 2011/0320346 A1* | 12/2011 | Reichman | .............. G06Q 20/10 |
| | | | 705/39 |

FOREIGN PATENT DOCUMENTS

| | | | | |
|---|---|---|---|---|
| EP | 3389280 A1 | * | 10/2018 | ........... H04L 9/3242 |
| WO | 2013101809 | * | 7/2013 | ............. G06Q 40/06 |

OTHER PUBLICATIONS

Wang et al.: Learning to Hash for Indexing Big Data—A Survey, Sep. 17, 2015, Proceedings of IEEE, pp. 1-22 (Year: 2015).*
Trust Computing Group (TCG): Trust Platform Module Library, Part 1 Architecture, Mar. 13, 2014, pp. 1-268 (Year: 2014).*

* cited by examiner

*Primary Examiner* — Bijendra K Shrestha
(74) *Attorney, Agent, or Firm* — North Shore Patents, P.C.; Michele Liu Baillie

(57) ABSTRACT

A system and method for the creation and management of one or more investment indexes utilizes a computer-based quantitative investment program without the need to examine or publish the actual source or executable code of such program. This may be accomplished by confirmation and certification, on an ongoing basis, that the identical processes and inherent quantitative rules are sustained and unchanged from the initial date the respective Index was first calculated. The system may consist of a remote server and network facility that separately hosts an input file, the proprietary quantitative software, and an output file.

16 Claims, 2 Drawing Sheets

SECURE FINANCIAL INDEXING

CROSS-REFERENCE TO RELATED APPLICATIONS

This application claims the benefit of U.S. Provisional Application No. 62/447,587 filed Jan. 18, 2017, the contents of which are incorporated herein by reference.

BACKGROUND

This invention relates to secure financial indexing, and more particularly to a distributed computing approach to such indexing that provides security and audit capabilities.

Indexing traded securities (such as for stocks and bonds) was introduced in 1884 by Charles Henry Dow and in 1896 by the Wall Street Journal publishing the Dow index daily. Today multiple trillions of dollars in mutual funds, ETFs, private pools and pension assets either benchmark against or invest according to an index or indexes. There are myriad organizations, such as Standard and Poor's, that develop, manage and publish indexes, and there are thousands of investment firms using indexes for investment or investment benchmarking. Investors use such indexes to look into the past to study the hypothetical performance of the index under various historic scenarios, including actual market conditions as they existed in the past. Investors also use an index to "benchmark" or compare the index to say a mutual fund's actual performance.

Present-day indexes are generally based on published rules whereby individual securities are selected and weighted according to such rules. Until recently, virtually all indexes prescribed investment in stocks or bond portfolios seeking to capture gains only if the respective stocks or bonds grew in value (long-only investing). Security selection in these indexes is prescribed using specific characteristics. For example, the S&P 500 index identifies the 500 largest public companies, by market capitalization, and weights the percentage ownership of shares in each company based on such market capitalization. By contrast, the VIX index uses a more complex set of rules based on options prices to infer future market volatility. These rules are typically spelled out in somewhat plain language and the selection of the securities follow such rules accordingly. Investors are able to take comfort in the assurances by a third party that the rules are sustained and unchanged for each index.

Investors can thus monitor their investment, in say, a mutual fund, to measure actual investment results against the performance of the index as calculated and published by the third-party index manager. Such comparison measurements between actual investment results and the hypothetical performance of the respective index is known in the trade as tracking error.

More valuable to the investor, is that prior to making an investment in a fund, the investor can mimic or benchmark an index. This is known in the trade as a hypothetical back-test of the index. A back-test is generated and published by the index manager using the very same rules and process that governs the selection of securities in the index to look back in time and attendant past data to calculate what the performance of the index would have been in years or decades past. An index allows a potential investor to study the hypothetical performance of the index over time and in different market environments and to compare live performance to the index expectations, or to integrate such performance with other investments to study the impact to an overall portfolio of investments.

The investor trusts a third party (i.e., a party other than the investor or the one who is making money executing the trade for the investor) to certify that the very same rules and tools are consistently applied to calculate back-test index performance as is used for actual performance from the date first used for actual investment.

Most modern indexes are monitored and modified by committee, but only within the rules. Although introducing human discretion to change the make-up of the index may change the securities in the index, that discretion simply applies the rules but does not change them. Introducing changes to the rules will, of course, erode the confidence and veracity of back-testing, as prior published performance results may not have been calculated based on the revised inputs to index performance.

Unlike investment styles that track or benchmark to an index governed by a published set of rules and are judged based on relative performance to the respective index's performance, certain other investment styles seek what is known in the trade as absolute performance, that is, positive performance across multiple market cycles, generally with low correlation to market performance (beta). Interest by investors, both institutional and individual, in absolute-return investment programs has grown substantially since 1980. Proprietary quantitative investment styles constitute a significant and growing portion of the absolute return universe and are very rarely used to create an index because the developer of such quantitative or algorithmic trading strategy must keep his or her trading programs proprietary in order to exact commercial benefit. Third party index calculators will not certify the accuracy of a back-tested performance of an undisclosed quantitative investment method because they have no means of auditing that the rules (generally expressed as software-based algorithms) have not been modified over time. The few indexed quantitative programs, such as the S&P Dynamic VEQTOR Index discloses the mathematics of the program, albeit undiscernible to all but the most mathematically sophisticated.

Excepting a very few indexes that disclose the quantitative rule-book, investors have no reliable, third party-certified means of looking back in time to see how an undisclosed quantitative program may have performed in various market conditions, and no means to track the difference between actual results in a quantitative investment program and expected outcomes. The key to the veracity of any back-test is the certainty that the rules governing the index and the inputs to those rules have not been changed at any time following the calculation of the back-test performance. In other words, there is currently no means for an independent party to stand behind the veracity of back-tested performance based on undisclosed rules.

Various financial industry rules and regulation do not allow for the use and disclosure of back-tested performance as it relates to mutual funds, ETFs or other "retail" investment pools. Private funds on the other hand, for example institutional hedge funds, may develop and disclose back-tested performance of their investment strategies. Therefore, the individual retail investor is generally deprived of any means of studying the hypothetical performance of a contemplated investment over multiple market cycles, particularly if it is new and without a long term track record of its own. This handicap for the retail investor has contributed significantly to the explosion in passive (indexed) investment, particularly as it relates to passive ETFs. While an ETF that follows a published index may not disclose or promote a back-test under the rules, its sponsor can point to the index for the back-test and be judged based on the tracking error to that respective index. Proprietary quantitative investment programs presently have no means of independent certified indexing and thus the retail investor is significantly handicapped vs. the institutional investor if contemplating a proprietary quantitative investment strategy. There is a need to address this conundrum.

SUMMARY

In one aspect, a computer-based financial system provides a new, innovative and scientific approach to indexing, based on a set of defined and unchanging rules that govern index input, as well as a means of reliably confirming that the process of security selection and weighting does not change over time. This is achieved without disclosing the underlying formulae, yet providing an audit method to confirm the unchanging In another aspect, in general, a method is directed to secure attested publication of values of a financial index, for example, over the public Internet. The method uses a trusted computer-implemented financial platform, for example using a secure computing facility or a secure processor. First index code implementing a first index-computing procedure is received at the trusted platform from an index provider. The first index code comprises instructions for execution on a data processor to process input data to yield quantitative index data, the input data including time series financial data for a plurality of financial instruments. A first code digest is computed from the first index code. The first code digest is a substantially non-invertible function (e.g., a hash value) of the first index code such that the first code digest uniquely corresponds to the first index code, and such that another index code implementing an index-computing procedure different than the first index-computing procedure yields using the substantially non-invertible function a code digest different than the first code digest. Attested index data that includes a plurality of index values is published from the trusted platform. This includes publishing a first attested index datum by accessing first input data including time series financial data for a plurality of financial instruments, the first input data being associated with a first time (e.g., close of a trading day on a first date), and then processing the first input data by executing the index code on the data processor to produce a first index value. This processing includes computing a first allocation among the plurality of financial instruments. The first index value is then a function of the first allocation and values (e.g., prices) corresponding to respective financial instruments of the plurality of financial instruments at the first time. The first index value is electronically publishing (e.g., transmitted or broadcast over the public Internet) for access by one or more consumer devices, for example, at personal computers of one or more traders. First linking data that cryptographically links the first index value and the first code digest is computed such that a change of either the first index value or the first code digest does not match the first linking data. The first linking data is electronically publishing for access by the one or more consumer devices.

The method is unconventional in that, although the consumer devices can establish trust that subsequent index values linked to the same first code digest are computed using the same index-computing procedure the details of that procedure may be hidden from them.

Aspect may include one or more of the following features.

The method further comprises, using the trusted financial platform, maintaining the first index code and the first allocation private to the trusted platform without disclosure to the one or more consumer devices.

Publishing the first attested index datum comprises combining the first index value, the first code digest, and the linking data into an index message, and publishing the index message to the one or more consumer devices.

Computing the first linking data comprises cryptographically signing (e.g., using a private key of the trusted platform) a combination of the first index value and the first code digest using a signing key. For example, enables the consuming device to verify the signature using a public key corresponding to the signing key of the trusted platform.

Receiving, from an index provider, the first index code comprises receiving an encryption of the first index code over a data network, and decrypting the encrypted index code at the trusted financial platform to yield the first index code.

The method further comprises securely providing the first allocation to a fund provider without disclosure to said allocation to the one or more consumer devices. This has an advantage of limiting distribution of the allocation, or at least delaying the distribution, while nevertheless enabling the consuming devices, which may interact with the fund provider, to have access to the current index value.

The attested index data is received at a consumer device, for example, under control of or by agreement with the trusted platform. This may include receiving a plurality of index values and corresponding code digests and linking data, including receiving the first index value, the first code digest, and the first linking data. For each index value of the plurality of index value the consuming device performs a verification that the linking data corresponding to the index value matches the corresponding code digest and a further verification that the code digest corresponding to each index value is a same digest value. In this way, the consumer device can establish trust that all the index values have been computed using the same index-computing procedure.

The linking data may comprise a cryptographic signature of a combination of the first index value and the first code digest using a signing key, and verifying that the linking data corresponding to the index value matches the corresponding code digest comprises verifying the cryptographic signature.

The method further comprises receiving a second attested index datum comprising a second code digest, and verifying that the first code digest is equal to the second code digest.

At the index provider, the method further includes securely transmitting the first index code to the trusted financial platform.

At the index provider, the first input data is processed by executing the first index code to compute the first allocation among the plurality of financial instruments.

The first allocation is provided from the index provider to a fund provider without disclosure to the allocation to the one or more consumer devices.

The trusted computer-implemented financial platform comprises a secure computing processor.

The steps of computing the first code digest from the first index code, executing the index code on the data processor to produce the first index value, and computing the first linking data are performed within the secure computing processor. In this way, trust in the attested index data may be established by the consuming devices trusting the secure computing processor, for example, via trust in the operator or manufacturer of the secure computing processor.

The method further includes using a trusted computer-implemented financial platform to compute a first plurality of reference index values corresponding to respective times. This includes computing each index value of the first plurality of reference index values by accessing reference data (e.g., historical financial data) including time series financial data for a plurality of financial instruments prior to the corresponding reference time for said index value, and processing the reference data by executing the first index code on the data processor to produce the index value. Reference linking data that cryptographically links the first plurality of reference index values and the first code digest is then computed. The first plurality of reference index values and the reference linking data first linking data are then electronically published.

The method further includes using the trusted computer-implement financial platform in a process that enables consumer devices to verify equivalence between the first index-computing procedure and a second index-computing procedure. This includes receiving, from the index provider, second index code implementing a second index-computing procedure, the second index code comprising instructions for execution on a data processor to process input data to yield quantitative index data, the input data including time series financial data for a plurality of financial instruments. A second code digest is computed from the second index code, the second code digest being a substantially non-invertible function of the second index code. A second plurality of reference index values corresponding to respective times are computed, including computing each index value of the second plurality of reference index values by accessing the reference data including time series financial data for a plurality of financial instruments prior to the corresponding reference time for said index value, and processing the reference data by executing the second index code on the data processor to produce the index value. Reference linking data is computed that cryptographically links the second plurality of reference index values and the second code digest. The second plurality of reference index values and the reference linking data first linking data are then electronically published.

The first plurality of reference index values and the second plurality of reference index values are received at a consumer device. The consumer device verifies that the first index-computing procedure is equivalent to the second index-computing procedure by determining that respective index values of the first plurality of reference index values and the second plurality of reference index values are with a tolerance.

In another aspect, in general, a system and method are direct to creating and managing a proprietary quantitative index without the need to examine or publish the source or execution code of such program. Such system and method is comprised of a published set of rules governing the input elements of the index and a secure cryptographic system for the inspection and certification of the quantitative program as being precisely the same on each inspection date, such inspections being done by an independent party (independent from the developers of the index rules and quantitative program). Inspection may be done upon the frequency desired by the respective independent party.

The system can also provide that such inspection and certification be done without the inspector having access to the actual source or executable code of the quantitative program underpinning the index, thereby preserving its trade value. Furthermore, the invention provides for an ongoing inspection of the output of the program to calculate the tracking error, if any, between the output from the index and the actual results of any investment program utilizing the index for investment or benchmarking purposes.

In some examples, a first element is a published, copy-written or patented set of rules governing the input data used by the proprietary quantitative program to calculate an output. A second element of the invention is a means to enter the input data into the proprietary quantitative program without having access to such program. A third element is a cryptographic checksum hash function to inspect the proprietary quantitative program to certify that such program has not been modified in any way between inspections, such inspections may be done remotely by an independent party, and without reading or otherwise seeing the source or execution code of the program.

Aspects of the invention can preclude and prevent any discretionary control or influence over the compositions or performance of an index. Aspects employ a third party trusted platform and use cryptographic techniques to independently certify, as unchanged, the rules, processes, formulae and calculations used by the index to select financial instruments and allocation. Investors can gain the benefit of having a trusted platform manager calculate the hypothetical historic performance of the index for analysis under differing market conditions over time, and to calculate the ongoing performance of the index with the assurance that the same rules and program are being used consistently. That is, the approach provides a reliable and trust-worthy way to index proprietary quantitative investment programs without the need to disclose the intricacies and trade secrets of such a program.

Other features and advantages of the invention are apparent from the following description, and from the claims.

DESCRIPTION

Figure 1A:
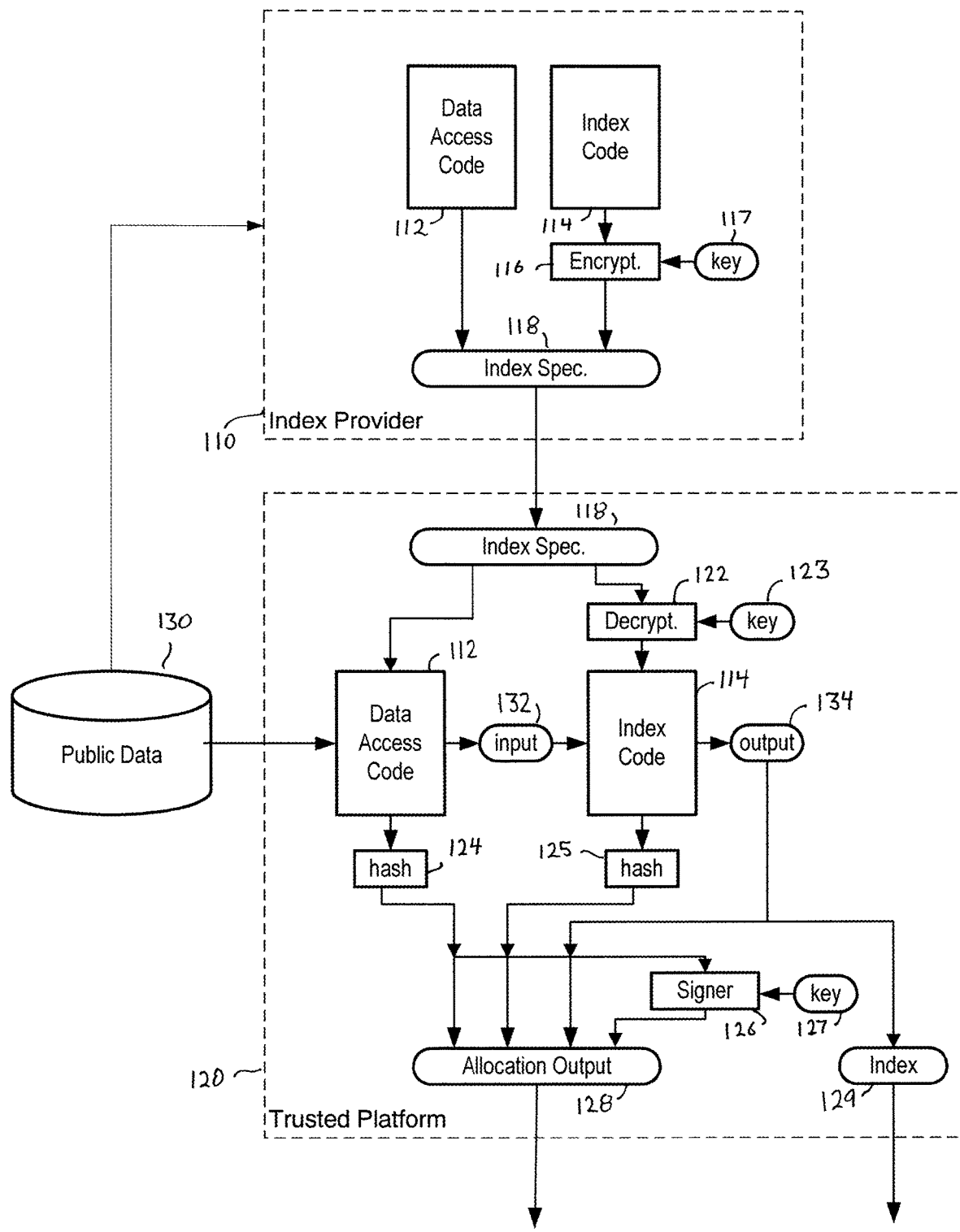
FIGS. 1A-B are a block diagram of an index-based trading system.
Figure 1B:
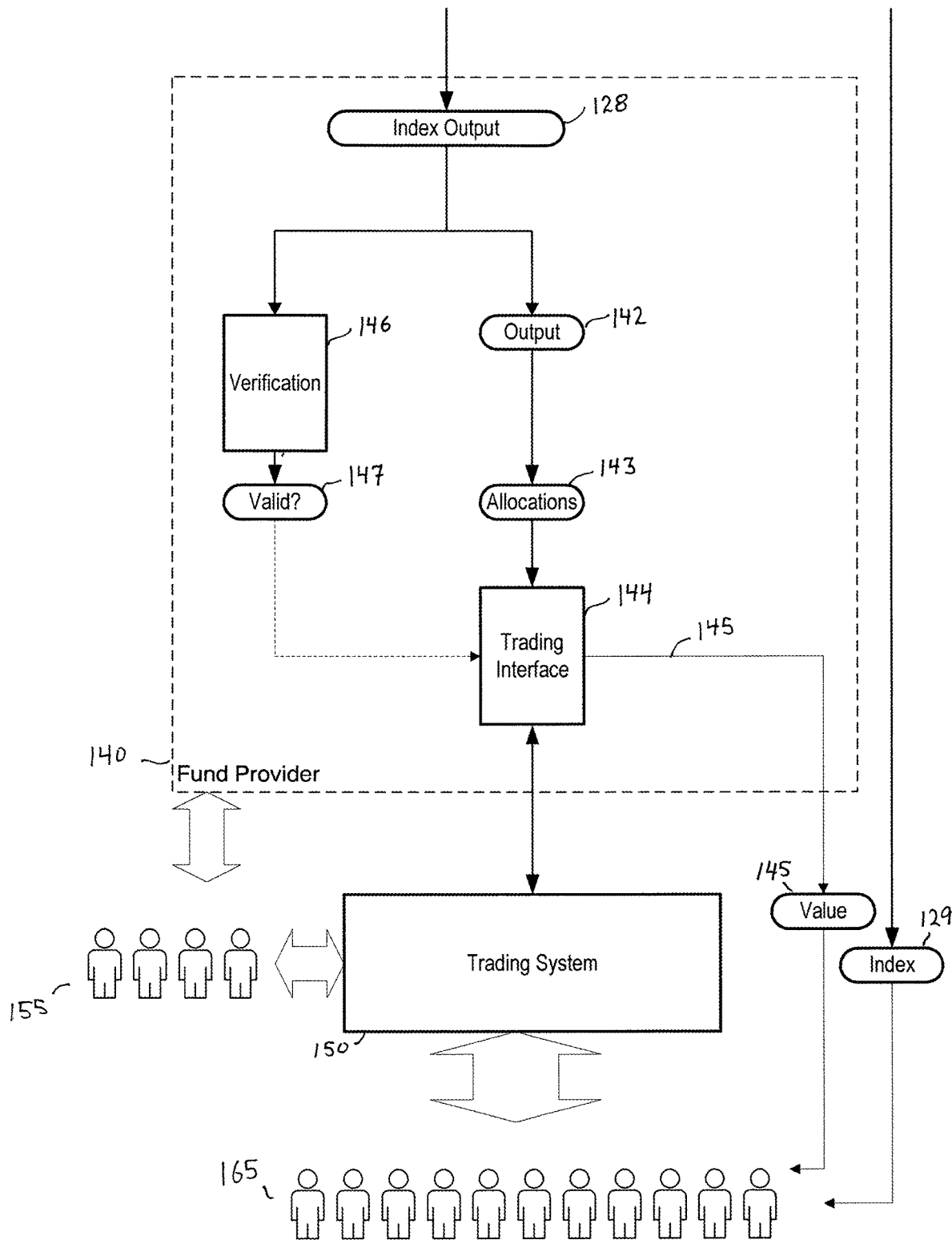

Referring to FIGS. 1A-B, computer-implemented financial system 100 involves a number of independent parties. An index provider 110 develops an index that can be computed from public data 130. In particular, the index provides a procedure, represented as index code 114, that can process the public data 130 to produce an index 129 from that data. In some implementations, this index code is also referred to as a Proprietary Quantitative Investment Program ("QIP"). Referring to FIG. 1B, investors 155, 165 have access to the index 129 as its holdings vary time-to-time, as well as a value 145 of a fund that is meant to track that index.

As introduced above, in the case of a disclosed index, such as the S&P 500 index, code (or other specification) for computing the index from public data is disclosed to the public, including the investors 155, 165, and therefore these investors have a mean of confirming that the index is being provided to them according to the code or specification, and therefore no trust is required between the investors and S&P, who define the index.

In the approach described below, the index provider 110 does not disclose the code or specification for computing the index to the public, and in particular to the investors 155, 165. Nevertheless, through a set of trust relationships and cryptographically supported attestations of remote computation of the index by a trusted party, the investors are able to rely on the index (i.e., its rules and procedures) being unchanged, and matching past behavior. In this way, the investor may make investment decisions regarding whether or not to invest in a fund that tracks the index based on this reliance.

The approach does not merely automate conventional approaches to use of indexes in financial markets. Rather, the new approach leverages computing approaches of encryption and attestation of execution of trusted computing platforms that have not before been used in computer-supported financial system. For example, a party (e.g., a fund manager) wishing to provide access to an index-based fund may be able interact with investors who trust that party not to change the index computation to their detriment. However, there has been no means for an investor to access such index-based funds without such a level of trust.

Continuing to refer to FIG. 1A, in the system 100, the index provider 110 does not publish the index value directly. Rather a trusted platform 120, is given access to the index code 114 by the index provider 110. The index provider trusts that the trusted platform 120 will protect the index code. In particular, the index provider 110 encrypts the index code 114 using an encryptor 116 using a key 117, for example, a private key 117 of a private/public pair that is known only to the index provider.

Optionally, the index provider 110 also provides data access code 112, which can process the public data 130 to produce input time series data to the index code 114 in a manner that does not expose the time the data actually occurred in the public data. As discussed below, this separation of data access code 112 and index code 114 may provide further confidence in the historical assessment of the index. There is no requirement that the data access code 112 be kept secret. The combination of the data access code 112, and the encrypted index code 114 forms an index specification 118 provided by the index provider. Optionally, the index specification may be cryptographically signed by the index provider, for example, using the same private key 117 known only to the index provider.

The trusted platform 120 receives this index specification, and uses it for various computations of index values. One use is in daily publications of the value of the index. In conjunction with the value of the index another use is in a corresponding allocation of investments (e.g., equities) that yield that value of the index. Continuing to refer to FIG. 1A, the trusted platform decrypts the index code 114 using a key 123, for example, a public key corresponding to the private key 117 used to encrypt the index code. Having decrypted the index code, the trusted platform 120 can process public data 130 via the data access code 112 to yield an input 132, which is in turn processed by the index code 114 to yield the output 134 of the index code.

Although in simple cases, the input 132 may correspond merely to prices of a fixed set of equities on that day, more generally, the input may include historical information enabling the index code 114 to form the index based on trends, volatility, or other factors that go beyond a snapshot of current prices.

In general, the output 134 of the index code 114 includes the value of the index 129, as well as a specification of the underlying allocation of investments that make up the index. To attest to the use of the particular index code 114, as well as the particular input 132 to the index code, the trusted platform 120 computes a hash 125 of the index code. To attest to the input 132, the trusted platform computes a hash 124 of the data access code, or alternatively (not shown) computes the hash directly on the input 132. The output 134 of the index code along with the hash values are included in an allocation output 128 that is provided by the trusted platform. In addition, the trusted platform cryptographically signs the allocation output using a signer 126 based on a key 127.

A party (e.g., an investor, or a fund manager) that receives the allocation output 128, who trusts that the allocation output has come from the trusted platform (e.g., because it can verify the cryptographic signature in the allocation output), and that trusts that the trusted platform 120 has truly computed the output 134 using the index code 114 that produced the hash of that code, is able view a series of outputs, for example, on sequential days, and know that the same code was used to compute the output on each day and that there was no change in that code.

Referring to FIG. 1B, one type of consumer of the allocation output 128 from the trusted platform 120 is a fund provider 140. The fund provider is able to apply a verification component 128 to the allocation output 146 to verify that the hash values have not changed, and that the signature of the trusted platform is valid, yielding a validity output 147. To the extent that the fund provider 140 determines validity, it accesses an output 142, which includes investment allocations 143 in the output 134 computed at the trusted platform. The fund provider may then use a trading interface 144 to purchase or sell investments via a trading system 150 to match the allocations 143.

In some examples, the fund provider 140 may receive direct investments from investors 155, and in turn the fund provider purchases investments according to the allocation, and conversely, if the investors redeem their investments, the fund provider may sell investments to generate the funds to provide the to selling investors.

It should be understood that although the above-described operation has some attributes in common with conventional index-based mutual funds, there are also significant differences. Consider for example, the case of a conventional mutual fund that aims to track the S&P 500 index. In such a case, the allocation of stocks (i.e., the identity and weighting of stocks) in the index is public, for example, being updated infrequently (e.g., annually) in a predictable manner (e.g., as a market-value weighted combination of the stocks of the 500 largest US companies). Therefore, having received the allocation information, for example, directly from S&P, or via some other public source, the fund provider is able to establish a fund that investors 155 can invest in knowing that they can monitor whether the fund is tracking the published index from day to day. However, there is no option for S&P to keep its procedure for determining the stocks and their weighting secret while still providing the ability for the investors to trust the index. In the approach described above, the investors 155 and fund provider 140 do not have to have to trust the index provider 110 to not inadvertently or maliciously change the index code (for example, for its own fraudulent advantage), and the index provider does not need to trust that the fund provider 140 to not exploit the index code 114 without authorization. Rather, what is each of these parties has a degree of trust in the trusted platform 120 to accurately attest to the execution of the index code 114.

Note that while investment via the fund provider 140 may be analogous to investment in an index-based mutual fund, the fund provider may provide shares that are traded on the trading system 150 among secondary investors 165 in an approach analogous to conventional Exchange Traded Funds (ETFs). That is, an investor 155 may initially purchase shares from the fund provider 140, and then those shares are traded on the secondary market by the investors 165. As the allocations 143 change, the fund provider may trade underlying investments to match the index allocations provided to it from the trusted platform 120 based on the index code 114 developed by the index provider 110.

It should be understood that the trusted platform may take various forms. In some cases, a single institution, for instance the Nasdaq Stock Market, may operate the trusted platform. In this way, the trust that index providers and fund managers have in Nasdaq provides basis for operation of the financial system 100.

In some cases, the trusted platform 120 may be distributed among multiple independent parties, who each execute the index code and perform the hash operations on the index code. A party that receives consistent information from these multiple independent parties can have increased confidence in the result to the extent that the party believes that the parties are not colluding or have not been mutually compromised in some way.

In some cases, the trusted platform is a secure computing system in which the hash computations and results are performed in an environment whose security is attested to by a computing provider, for instance, a provider of secure computing processors or environments (e.g., using the standard Trusted Platform Module (TPM), Intel® Software Guard Extensions (SGX) technology), or a provider of "cloud" or "grid" computing environments. For example, all the components shown in the trusted platform 120 as illustrated in FIG. 1B may be hosted in such a secure computing processor or environment.

As introduced above, one aspect of an index is an ability to compute performance of the index over a specified dataset (e.g., a specified historical interval) in order for an investor to be able to assess whether they wish to invest based on that index. However, when an index provider first constructs index code 114 for a new index, and does not disclose that index code, an investor cannot make that assessment. A general approach to providing such computed performance is for the trusted provider to perform the computation. For example, the data access code 112 extracts historical data from the public data, and forms successive inputs 132 that are processed by the index code 114. In the same manner that outputs are provided in the allocation output 128, a series of outputs based on historical data are provided in such an output, along with the hashes of the index code and the code used to access the historical data. In this way, a potential inventor may be able to assess how the index would have performed in the past.

In view of the past data having been available to the index provider 110, certain safeguards are available to mitigate the possibility of the index provider explicitly or implicitly yielding more optimistic performance than might be obtained on future data. First, because the data access code does not provide the dates of the input to the index code, nothing as simple as a statement "if date<authoring date then use approach #1 else use approach #2" can be implemented in the index code to result in different behavior for historical data input for future input. Furthermore, the trusted provider is free to synthesize a reference data time series, for example, by some sort of Monte Carlo approach, and provide that input and the corresponding index code output. In this way, an effect of implicit "over training" of the index code on historical data may be mitigated.

Another feature of the approach is the ability to make changes in the index code 114 that do not have substantial effect on past performance, but are nevertheless desirable, for example, from a software engineering or economics point of view. In such a situation in which the trusted provider have both an old version of the index code and a new version of the index code, the trusted platform can provide the output of executing both versions on historical and/or synthesized input, and attest to the degree of match of the index values that are produced. For example, the trusted platform may report the deviations (e.g., over time, average, maximum, etc.) and an investor can then make an informed decision of whether to consider the new version to be essentially unchanged or to be effectively correspond to a new index.

In examples of the approached described above, the index code comprises instructions that are stored on a computer-readable medium and that may be executed by a physical or virtual processor or interpreted by an instruction processor. Therefore, human intervention (or any human judgement) can be avoided at the trusted platform that provides the appropriate processor. By way of a specific example, the index code may correspond to a Java language program that has been translated into bytecode instructions for execution in a Java Virtual Machine (JVM) in the trusted platform.

Other arrangements than that shown in FIGS. 1A-B may be used to achieve some, or all, of the features described above. In a relatively simple such alternative arrangement, a remote hosted server generally corresponds to the trusted platform 120 of FIG. 1, a laptop B generally corresponds to the fund provider 140, and a laptop A generally corresponds to the index provider 110. The remote hosted server hosts three separate files, comprised of an Input File, a Proprietary Quantitative Investment Program ("QIP") File, and an Output File. These three files are securely separated and accessible only with individual file passwords and with access to each file restricted to only pre-specified internet addresses. Access to the remote server and file programs are via the internet from one or more laptop or other apparatus connected to the internet, each having its own internet address.

In the example, Laptop A is issued to an Index Manager, and the laptop has an associated/assigned unique internet address. This Laptop A has remote access to only the Input File and Output File via the internet, but the Input File and Output File can only be access from the prescribed internet address using a pre-authorized password recognized by the Input File and Output File. Laptop B is issued to the developer or other authorized user of the Index and QIP File (the "Investment Manager") and that Laptop has an associated/assigned unique internet address. This Laptop B has remote access to the Input File and Output File, but cannot access the QIP without the password associated with Laptop A. This provides security against the Investment Manager gaining access to the QIP File without the knowledge of the Index Manager. Laptop A can change its password at any time.

The Input File consists of data that conforms to a set of rules governing the make-up of such data. In this example, this data may consist of the price of a security, derivative of a security, basket of securities, or other index as defined and delimited by said rules. At no time, may the rules and resulting input to the Input File differ from what is published and known to the Index Manager and Investment Manager investing in accordance with such index.

The QIP File may not be accessed by the Index Manager (or Investment Manager without both passwords). The QIP File is constantly seeking/asking for the Input File so that it might calculate an output. Once the Index Manager or Investment Manager provides data to the Input File in accordance with the input rules, the QIP takes such data and calculates an output which can be read by Laptop A and B assuming proper access has been granted to each.

The Index Manager is provided a checksum hash tool for delivery to the Input File. This tool allows for the periodic inspection of the QIP, and will identify if any single zero or one in the QIP has been added, subtracted, or has changes position, thereby providing a means to assure identical formulae and calculation of the index for any input data using the input rules.

In addition to the use of the hash tool, a second means of certification that the program used to produce a back-test is the same as is being used for ongoing investment, is provided, but only if the quantitative program has been used for actual investing for a meaningful period. Following the same input rules for the back-test as is used for live investment, a comparison of the hypothetical performance during the live investment period, should demonstrate a very high correlation if the same program is used for both. This exercise can be done on a daily basis in order to both calculate tracking error between the index and live performance and to further assure that the quantitative program has not been changed.

As an example of index code 114, and index is based on the total return of the S&P 500 (SPX). The index is based on a selection of securities or derivative that have greater than a 95% correlation to the S&P 500 index, constraining exposure to the S&P 500 index to 200% long to 200% short of the index. However, the index provider 110 does not disclose the methodology for selecting the allocation of underlying investments to satisfy these constraints.

Generally, the index code 114 for this example calculates the ever-changing distribution of price in accordance with the well-defined moments of such price distribution including mean, variance, skew and kurtosis as defined mathematically by standard, published calculation. The code interprets this evolving distribution using undisclosed statistical techniques to determine price direction and allocation.

The index code is calibrated so that the neutral position is zero exposure to the reference financial instrument (i.e., the S&P 500) and the output parameters may be calibrated to any allocation long or short the index. In other words, the code may call for as much as 300% long or short the reference financial instrument. However, the output file may be calibrated (capped) to different parameters, say 300% long and 100% short the reference financial instrument, but this calibration may not be changed in order to conform to the index rules. Both the moments of price distributions and statistical modeling are well-known, academically described techniques but the specifics need not be disclosed utilizing the described approach.

It should be recognized that the arrangement shown in FIGS. 1A-B show only a single index provider 110 and a single fund provider 140. However, a single trusted platform may support many index providers and many fund providers, and each index provider may provide many instances of index code, and each fund provider may use many indexes. Furthermore, an overall financial system may have multiple separate trusted platforms, and furthermore, multiple trusted platforms may execute the same index code from one index provider. Furthermore, the function of the index provider and the trusted platform may be merged into one entity. More generally, the index provider, the trusted platform, and the fund provider correspond to distinct entities, and the components shown in FIGS. 1A-B are separate computing systems coupled to one another over a data network, such as the public Internet.

Implementations of the approach may use hardware, software, or a combination of hardware and software. For example, as introduced above, the trusted platform may be or include a hardware secure environment such that the trust in the attestation of execution of the index code is by virtue of hardware structure of the platform. In other examples, the trusted platform is implemented in software that includes instructions that are stored on a non-transitory machine-readable medium. These instructions case a data processing system to perform the operations of the trusted platform described above. Other components may also be implemented in software, with corresponding instructions stored on machine-readable media for execution by data processing systems.

It is to be understood that the foregoing description is intended to illustrate and not to limit the scope of the invention, which is defined by the scope of the appended claims. Other embodiments are within the scope of the following claims.

What is claimed is:

1. A method for secure attested publication of values of a financial index, the method comprising, using a trusted computer-implemented financial platform:

receiving, from an index provider, first index code implementing a first index-computing procedure, the first index code comprising instructions for execution on a data processor to process input data to yield quantitative index data, the input data including time series financial data for a plurality of financial instruments;

computing a first code digest from the first index code, the first code digest being a substantially non-invertible function of the first index code such that the first code digest uniquely corresponds to the first index code, and such that another index code implementing an index-computing procedure different than the first index-computing procedure yields using the substantially non-invertible function a code digest different than the first code digest; and publishing attested index data that includes a plurality of index values, including publishing a first attested index datum, including accessing first input data including time series financial data for a plurality of financial instruments, the first input data being associated with a first time, processing the first input data by executing the index code on the data processor to produce a first index value, including computing a first allocation among the plurality of financial instruments, the first index value being a function of the first allocation and values corresponding to respective financial instruments of the plurality of financial instruments at the first time, electronically publishing the first index value for access by one or more consumer devices, computing first linking data that cryptographically links the first index value and the first code digest such that a change of either the first index value or the first code digest does not match the first linking data, and electronically publishing the first linking data for access by the one or more consumer devices.

2. The method of claim 1 further comprising, using the trusted financial platform, maintaining the first index code and the first allocation private to the trusted platform without disclosure to the one or more consumer devices.

3. The method of claim 1 wherein publishing the first attested index datum comprises, combining the first index value, the first code digest, and the linking data into an index message, and publishing the index message to the one or more consumer devices.

4. The method of claim 1 wherein computing the first linking data comprises cryptographically signing a combination of the first index value and the first code digest using a signing key.

5. The method of claim 1 wherein receiving, from an index provider, the first index code comprises receiving an encryption of the first index code over a data network, and decrypting the encrypted index code at the trusted financial platform to yield the first index code.

6. The method of claim 1 further comprising, securely providing the first allocation to a fund provider without disclosure to said allocation to the one or more consumer devices.

7. The method of claim 1 further comprising, at a consumer device
receiving the attested index data, including receiving a plurality of index values and corresponding code digests and linking data, including receiving the first index value, the first code digest, and the first linking data;
for each index value of the plurality of index value verifying that the linking data corresponding to the index value matches the corresponding code digest; and
verifying that the code digest corresponding to each index value is a same digest value.

8. The method of claim 7, wherein the linking data comprises a cryptographic signature of a combination of the first index value and the first code digest using a signing key, and verifying that the linking data corresponding to the index value matches the corresponding code digest comprises verifying the cryptographic signature.

9. The method of claim 7 further comprising, at the consumer device, receiving a second attested index datum comprising a second code digest, and verifying that the first code digest is equal to the second code digest.

10. The method of claim 1, further comprising, at the index provider:
securely transmitting the first index code to the trusted financial platform.

11. The method of claim 9 further comprising, at the index provider:
processing the first input data by executing the first index code to compute the first allocation among the plurality of financial instruments; and
providing the first allocation to a fund provider without disclosure to said allocation to the one or more consumer devices.

12. The method of claim 1, wherein the trusted computer-implemented financial platform comprises a secure computing processor, and wherein the steps of computing the first code digest from the first index code, executing the index code on the data processor to produce the first index value, and computing the first linking data are performed within the secure computing processor.

13. The method of claim 1 further comprising using a trusted computer-implemented financial platform:
computing a first plurality of reference index values corresponding to respective times, including computing each index value of the first plurality of reference index values by
accessing reference data including time series financial data for a plurality of financial instruments prior to the corresponding reference time for said index value, and
processing the reference data by executing the first index code on the data processor to produce the index value;
computing reference linking data that cryptographically links the first plurality of reference index values and the first code digest; and
electronically publishing the first plurality of reference index values and the reference linking data first linking data.

14. The method of claim 13 further comprising, using the trusted computer-implement financial platform:
receiving, from the index provider, second index code implementing a second index-computing procedure, the second index code comprising instructions for execution on a data processor to process input data to yield quantitative index data, the input data including time series financial data for a plurality of financial instruments;
computing a second code digest from the second index code, the second code digest being a substantially non-invertible function of the second index code;
computing a second plurality of reference index values corresponding to respective times, including computing each index value of the second plurality of reference index values by
accessing the reference data including time series financial data for a plurality of financial instruments prior to the corresponding reference time for said index value, and
processing the reference data by executing the second index code on the data processor to produce the index value;
computing reference linking data that cryptographically links the second plurality of reference index values and the second code digest; and
electronically publishing the second plurality of reference index values and the reference linking data first linking data.

15. The method of claim 14 further comprising, at a consumer device,
receiving the first plurality of reference index values and the second plurality of reference index values; and
verifying that the first index-computing procedure is equivalent to the second index-computing procedure, including determining that respective index values of the first plurality of reference index values and the second plurality of reference index values are with a tolerance.

16. The method of claim 13 wherein the reference data comprises historical financial data.

* * * * *